US012594889B2

(12) United States Patent
Corrodi et al.

(10) Patent No.: US 12,594,889 B2
(45) Date of Patent: Apr. 7, 2026

(54) VEHICLE DISPLAY INCLUDING AN OFFSET CAMERA VIEW

(71) Applicant: Stoneridge, Inc., Novi, MI (US)

(72) Inventors: Brad Corrodi, Princeton, NJ (US);
Troy Otis Cooprider, White Lake, MI (US); Liang Ma, Rochester, MI (US); Banuprakash Murthy, Novi, MI (US)

(73) Assignee: STONERIDGE, INC., Novi, MI (US)

( * ) Notice: Subject to any disclaimer, the term of this patent is extended or adjusted under 35 U.S.C. 154(b) by 0 days.

(21) Appl. No.: 18/285,596

(22) PCT Filed: Apr. 6, 2022

(86) PCT No.: PCT/US2022/023593
§ 371 (c)(1),
(2) Date: Oct. 4, 2023

(87) PCT Pub. No.: WO2022/216775
PCT Pub. Date: Oct. 13, 2022

(65) Prior Publication Data
US 2024/0367588 A1     Nov. 7, 2024

Related U.S. Application Data

(60) Provisional application No. 63/171,815, filed on Apr. 7, 2021.

(51) Int. Cl.
B60R 1/28          (2022.01)

(52) U.S. Cl.
CPC .......... B60R 1/28 (2022.01); B60R 2300/105 (2013.01); B60R 2300/303 (2013.01); B60R 2300/602 (2013.01)

(58) Field of Classification Search
CPC ................ B60R 1/28; B60R 2300/105; B60R 2300/303; B60R 2300/602; B60R 2300/605; G06T 15/20; G06V 20/56
See application file for complete search history.

(56) References Cited

U.S. PATENT DOCUMENTS 7,307,655 B1 * 12/2007 Okamoto ................ G06T 15/10
                                                                            348/222.1
9,102,269 B2     8/2015 Waite et al.
(Continued)

FOREIGN PATENT DOCUMENTS

DE     102016220894 A1     4/2018
EP         1115250 A1     7/2001
(Continued)

OTHER PUBLICATIONS

International Search Report for International Application No. PCT/US20221023593 dated Jun. 27, 2022.
(Continued)

*Primary Examiner* — Hesham K Abouzahra
(74) *Attorney, Agent, or Firm* — Carlson, Gaskey & Olds, P.C.

(57)          ABSTRACT
A mirror replacement system for a motor vehicle includes a plurality of cameras (22,24) disposed about a vehicle. A vehicle controller is connected to each camera and includes an extrapolation algorithm configured to generate at least one extrapolated image based at least in part on an image feed from the plurality of cameras. The extrapolated image is from the perspective of a virtual camera position (50, 50', 50") offset from the vehicle. A display is configured to display the extrapolated image to a vehicle operator.

16 Claims, 3 Drawing Sheets

(56)  References Cited

U.S. PATENT DOCUMENTS

| | | |
|---|---|---|
| 9,104,920 B2 | 8/2015 | Yoon et al. |
| 9,738,224 B2 | 8/2017 | Gieseke et al. |
| 10,324,297 B2 | 6/2019 | Kunze |
| 10,542,244 B2 | 1/2020 | Pflug |
| 2010/0259372 A1 | 10/2010 | Hideshiro |
| 2015/0009010 A1 | 1/2015 | Biemer |
| 2015/0294169 A1 | 10/2015 | Zhou et al. |
| 2016/0080699 A1* | 3/2016 | Scholl ........................ G06T 3/08 |
| | | 348/148 |
| 2018/0308275 A1 | 10/2018 | Fortmann |
| 2019/0141310 A1* | 5/2019 | Pohl ..................... H04N 13/122 |

FOREIGN PATENT DOCUMENTS

| | | | |
|---|---|---|---|
| EP | 3547677 A1 | 10/2019 |
| JP | 2007295357 A | 11/2007 |
| KR | 101413231 B1 | 6/2014 |
| WO | 0064175 A1 | 10/2000 |
| WO | 2004077175 A2 | 9/2004 |

OTHER PUBLICATIONS

International Preliminary Report on Patentability for International Application No. PCT/US2022/023593 dated Oct. 19, 2023.

* cited by examiner

VEHICLE DISPLAY INCLUDING AN OFFSET CAMERA VIEW

CROSS-REFERENCE TO RELATED APPLICATION

This application claim priority to U.S. Provisional Patent Application No. 63/171,815 filed on Apr. 7, 2021.

TECHNICAL FIELD

The present disclosure relates generally to vehicle displays for mirror replacement or mirror supplement systems, and more specifically to a system for including a third person offset view within the vehicle display.

BACKGROUND

Vehicle systems, such as those present in commercial shipping vehicles, often include camera feeds that are used in conjunction with conventional vehicle mirrors to generate a supplementary view for the vehicle operator. In some cases, the vehicle cameras can be operated to replace one or more mirrors in a mirror replacement system. In other cases, the cameras provide views that may not be available via conventional mirror placement (e.g. a reverse facing camera in a tail light, providing a reverse view). Existing systems are limited to vantage points generated by the fixed position of an actual physical camera. As a result, the displays are limited in the information that can be conveyed to the vehicle operator.

SUMMARY OF THE INVENTION

In one exemplary embodiment a mirror replacement system for a motor vehicle includes a plurality of cameras disposed about a vehicle, a vehicle controller connected to each camera in the plurality of cameras, the vehicle controller including an extrapolation algorithm configured to generate at least one extrapolated image based at least in part on an image feed from the plurality of cameras, the extrapolated image being from the perspective of a virtual camera position offset from the vehicle, and a display configured to display the extrapolated image to a vehicle operator.

Another example of the above described mirror replacement system for a motor vehicle further includes a plurality of sensors disposed about the vehicle, each sensor being communicatively coupled to the vehicle controller.

In another example of any of the above described mirror replacement systems for a motor vehicle the plurality of cameras includes cameras configured to generate at least one of a class II view, a class IV view, a class V view, a class VI view, and a class VIII view.

In another example of any of the above described mirror replacement systems for a motor vehicle the virtual camera position is one of multiple fixed virtual camera positions stored in the vehicle controller.

In another example of any of the above described mirror replacement systems for a motor vehicle the displayed virtual camera position is selected from the multiple fixed virtual camera positions based on a location of an object detected by the vehicle controller.

In another example of any of the above described mirror replacement systems for a motor vehicle the displayed virtual camera position includes an obstruction between the virtual camera position and the object detected by the vehicle controller, and where the obstruction is rendered at least partially transparent.

In another example of any of the above described mirror replacement systems for a motor vehicle the virtual camera position is manually adjustable by the vehicle operator.

In another example of any of the above described mirror replacement systems for a motor vehicle the virtual camera position is adjustable on a single axis.

In another example of any of the above described mirror replacement systems for a motor vehicle the virtual camera position is adjustable on two axes.

In another example of any of the above described mirror replacement systems for a motor vehicle the virtual camera position is adjustable on three axes.

In another example of any of the above described mirror replacement systems for a motor vehicle the vehicle controller is connected to at least one source of data exterior to the vehicle, and wherein data from the at least one source is used by the extrapolation algorithm.

In another example of any of the above described mirror replacement systems for a motor vehicle the at least one source of data includes a wireless connection to a local sensor.

In another example of any of the above described mirror replacement systems for a motor vehicle the at least one source of data includes a fleet management system connected to the vehicle controller via a long range wireless connection.

In another example of any of the above described mirror replacement systems for a motor vehicle the extrapolated image is a video image In another example of any of the above described mirror replacement systems for a motor vehicle the at least one extrapolated image includes at least two extrapolated images.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
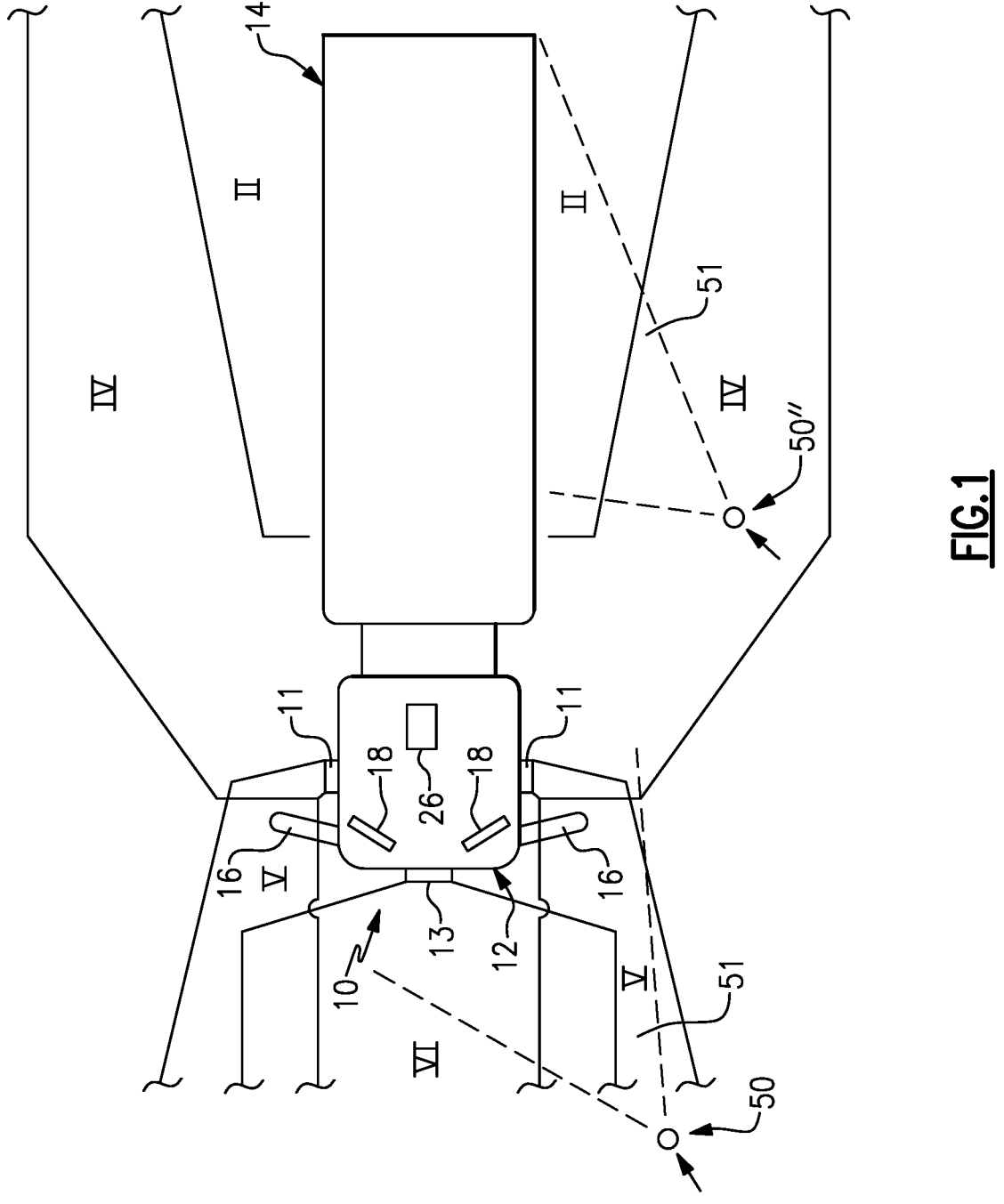
FIG. 1 illustrates a high-level schematic view of a commercial shipping vehicle.

A schematic view of a commercial truck 10 is illustrated in FIG. 1. The truck 10 includes a vehicle cab 12 pulling a trailer 14. Driver and passenger side camera housings 16 are mounted to the vehicle cab 12. If desired, the camera housings 16 may include conventional mirrors integrated with them as well. First and second displays 18 are arranged on each of the driver and passenger sides within the vehicle cab 12 to display class II and class IV views on each side of the vehicle 10. Fewer or more displays may be used than shown, including additional class displays, and the displays may be located differently than illustrated. In alternative examples, the offset virtual cameras described herein can be utilized by combining images to form the offset virtual camera using additional cameras 11 (providing class V views) and camera 13 (providing a class VI view). In yet further examples, additional cameras generating a class VIII view can be included in the process. The illustrated camera positions are exemplary only, and practical implementations can include multiple additional cameras of any particular view type as may be needed by a given system.

Figure 2:
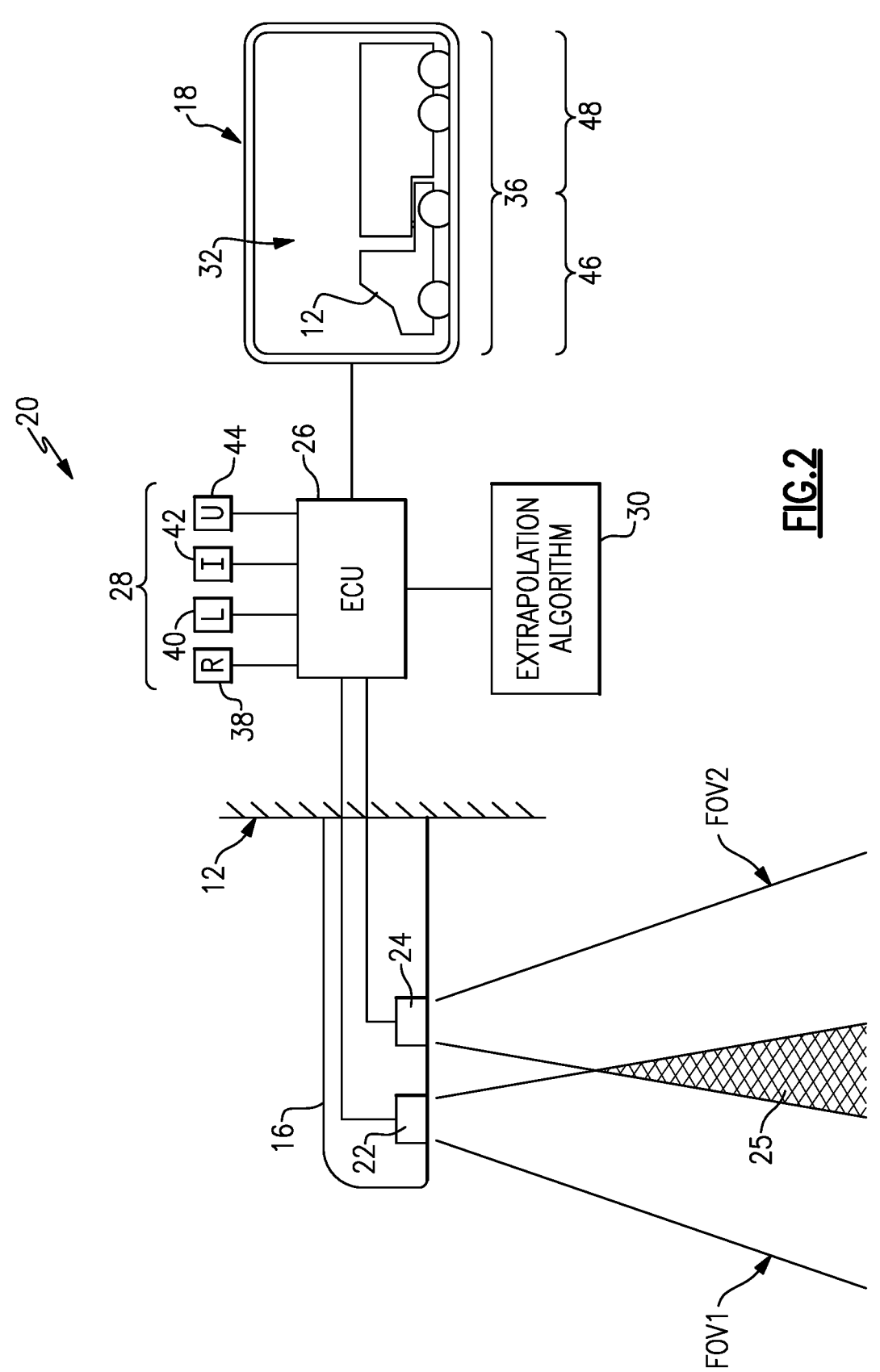
FIG. 2 illustrates an exemplary display of the commercial shipping vehicle of FIG. 1.

One example camera mirror system 20 is shown in a highly schematic fashion in FIG. 2. In one example, rearward facing first and second cameras 22, 24 are arranged within the camera housing 16. The first and second cameras 22, 24 provide first and second fields of view 22 FOV1, FOV2 that correspond to the class IV and class II views, for example. The first and second fields of view FOV1, FOV2 overlap with one another to provide an overlap area 25. It should be understood, however, that the cameras may be placed differently than illustrated and the fields of view provided may relate to other classes or other views entirely. In addition to the physical cameras 22, 24 multiple virtual cameras 50, 50', 50" are generated by the vehicle controller 26. The virtual cameras 50, 50', 50" use an extrapolated image presented from a viewpoint that is offset from the vehicle 12, and the viewpoint is in a spatial location where a physical camera is not located. In some examples, the offset position of the virtual camera 50 is a position where it would not be possible to locate a camera (e.g., in front of, and diagonally offset from, a moving vehicle.) In some examples, the positioning of the virtual cameras 50, 50', 50" is a preset position, relative to the vehicle 12, with the vehicle operator being able to provide moderate adjustments of the virtual camera 50, 50', 50" along two axis. In other examples, the position of the virtual cameras 50, 50', 50" can be freely controlled by the vehicle operator with the position of the camera in 2 or 3 axis being able to be adjusted.

An ECU, or controller, 26 is in communication with at least the first and second cameras 22, 24. In alternative examples, additional or alternate cameras can be connected to the ECU 26, depending on the specific configuration of the given system. By way of examples, additional cameras could be disposed on the trailer 12, at alternate positions on the cab 10 and/or at alternate orientations on the cab 12. Various sensors 28, such as a radar sensor 38, a LIDAR sensor 40, an infrared sensor 42, and/or an ultrasonic sensor 44 may be in communication with the controller 26. Further, in systems such as the system illustrated in FIG. 3, additional image sources and/or sensors from exterior to the vehicle can be provided from remote systems that are connected to the vehicle via a wireless data connection. In such systems, the remote image sources provide the image feed as well as a geospatial location and orientation of the image source to the vehicle. The geospatial location can be an objective position in the world (e.g. a position determined via a satellite positioning system) or a position relative to the vehicle 10, and the information can be provided to the vehicle via any system.

In some examples, the sensors 28 and/or first and second cameras 22, 24 are used to detect objects within the images captured by the first and second cameras 22, 24 and/or objects within the environment that the vehicle is operating in. Any number of suitable object detection schemes may be used, such as those that rely on neural networks and 3D geometry models to determine positions of objects in space, such as detection from ego-motion. In the case of object detection using a neural network, the first and second cameras 22, 24 provide at least one of the sensors used to detect the object. In alternative examples, any object detection system can be used to detect objects within an image plane, including image-based detection such as neural networks analysis, as well as detecting images in 3D space using 3D space detection systems such as radar, lidar, sensors and the like.

The controller 26 generates a virtual camera view and outputs a video signal to be displayed on the display 18. The video signal is an extrapolated offset view of the vehicle 12 from the perspective of one of the virtual cameras 50, 50', 50". In the illustrated example, the virtual camera 50 provides a side view of the left side of the vehicle 12 from the perspective of a camera positioned offset from the vehicle and forward of the vehicle 12. The virtual camera 50' provides a side view of the right side of the vehicle 12, similar to the virtual camera 50, and the virtual camera 50" provides a side view of the trailer 14, offset from the vehicle. In alternative examples virtual cameras 50 can be positioned in alternative useful locations, such as offset from the rear of the vehicle. When paired with object detection systems, the controller 26 can determine a particular virtual camera 50 vantage point that provides a field of view including a detected object, or a field of view that would include the detected object if an obstruction were made transparent. Once the particular virtual camera 50 vantage point is identified, the controller 26 can cause the virtual camera 50 to be automatically displayed to the vehicle operator, thereby further enhancing the vehicle display.

In some examples, the virtual camera 50 can be used to provide an obstructed view image. An obstructed view image is an image from a virtual vantage point 50, 50', 50" that includes features or objects that are obstructed by a second feature or object. In such examples, the second feature or object is made transparent such that the obstructed feature or object is also visible behind second feature or object.

The virtual cameras 50, 50', 50" provide a vantage point, or camera position, for an image that is generated using a combination of the images from the first and second cameras 22, 24 (and/or any other appropriate cameras) based upon an extrapolation algorithm 30. The image is referred to generally as an "extrapolated image" because it utilizes a combination of the sensor readings and multiple images to create a single virtual camera position offset from the vehicle 12. In the example, a screen 32 of the display 18 provides a virtual view 36 including the extrapolated image from the extrapolation algorithm.

In some examples, the extrapolation algorithm 30 generates the image using a combination of image stitching (combining two overlapping fields of view from physical cameras), image tilting, image skewing and the like to extrapolate the field of view of the virtual camera 50. By way of example, if a vantage point forward and to the left of the vehicle 12 is desired, the extrapolation algorithm 30 uses a combination of image stitching, tilting, skewing and parallax effects to generate an offset virtual camera position. In one example, image areas that are outside of the virtual field of view are removed or replaced with white space to further enhance the virtual effect. In another example, the virtual field of view can include depictions of objects having an obstructed view, or a partially obstructed view, with the obstruction being rendered transparent or partially transparent.

Figure 3:
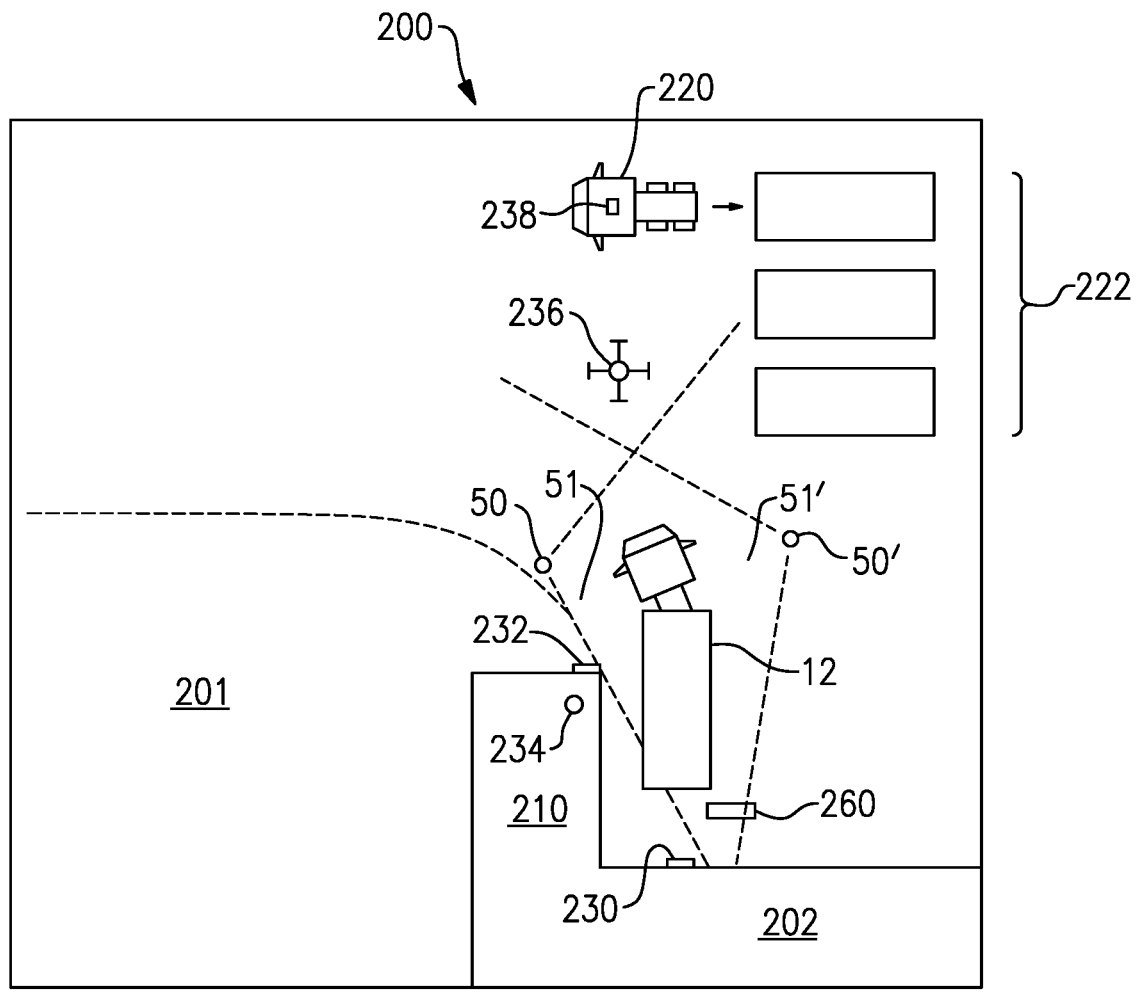
FIG. 3 schematically illustrates the commercial shipping vehicle of FIG. 1 included in an expected operating environment.

With continued reference to FIGS. 1 and 2, FIG. 3 illustrates an exemplary operating environment 200 including additional sensor and image sources that can be used by the extrapolation algorithm 30 of FIGS. 1 and 2 to generate the virtual camera 50 field of view 51. The exemplary operating environment is a commercial shipping yard 201 including a warehouse structure 202 with a loading dock 210. The commercial shipping yard 201 also includes a hitching location for unconnected tractors 220 to connect to corresponding trailers 222. Disposed throughout the shipping yard 201 are multiple sensors 231, 232, 234 including proximity sensors 230, 232 disposed on the warehouse and the loading dock 210 as well as a stationary loading dock camera 234 and a mobile camera 236 disposed on a drone.

Behind the vehicle 12, positioned in a location that is obstructed from traditional mirror views and conventional camera mirror system views, is an object 260. Due to the presence of the loading dock 210, and the positioning of the mirrors on the cab, the object 260 is not visible to a vehicle operator during a reversing maneuver of the vehicle 12. In order to improve the operations, the virtual camera 50 provides a field of view 51 that includes the vehicle 12, and a corner of the loading dock 210. When extrapolating the image of the virtual camera 50, the portions of the vehicle 12 and the loading dock 210 are made transparent, allowing the object 260 to be seen from the virtual camera position 50.

Similarly, the alternate virtual camera position 50' has a field of view 51' that includes the vehicle 12 partially obstructing the object 260. The portion of the vehicle 12 can be similarly rendered transparent to achieve the same effect.

The vehicle 12 is connected to each of the various sensors within the operating environment either through ad-hoc connections such as blue tooth connections, wifi connections or other similar short-range wireless connections or through a fleet management system that is configured to receive all the sensor data and provide requested data including image feeds to the ECU 26 of each vehicle. By connecting the distributed sensors and cameras to the vehicle 12, the system is capable of identifying additional useful vantage points for the virtual camera as well as providing appropriate extrapolation data for generating the additional virtual vantage points. It is contemplated that in some examples, the virtual cameras 50, 50', 50" are generated solely from cameras and sensors disposed on the vehicle 12 itself, while in other examples, the virtual vantage points can utilize the additional data received from the operating environment.

Referring to all of FIGS. 1-3, in some examples the ECU 26 includes a predefined set virtual cameras 50 as well as a predefined method for extrapolating the images to provide the predefined virtual cameras 50. The predefined virtual cameras 50 extrapolate to a fixed position relative to the vehicle 12. By including predefined virtual cameras 50, the system can include known extrapolation algorithms that easily and quickly define extrapolated image. In alternative examples, the ECU 26 can include an input by which the vehicle operator can adjust the position along one or two axis in order to provide more granular manual control of the virtual camera position. In yet further alternative examples, the operator can be provided the ability to shift the virtual camera 50 position on all three axis within the bounds of available data and image feeds. Once positioned by the operator, the ECU 26 maintains the virtual camera position until the operator adjusts the position.

In some additional examples, the ECU 26 can record or set specific virtual camera positions 50 for designated drivers and automatically display the corresponding views for the virtual camera positions 50 when the designated driver is the vehicle operator.

In other examples, the ECU 26 can include one or more virtual camera 50 vantage points corresponding to a particular operating condition of the vehicle 12. By way of example, the ECU 26 can include multiple vantage points associated with operating the vehicle while in reverse, turning the vehicle right, turning the vehicle left, or any other operating condition. When the vehicle enters the operating condition, the controller 26 causes the corresponding preset virtual camera 50 vantage point(s) to be displayed.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A mirror replacement system for a motor vehicle comprising:
   a plurality of cameras disposed about a vehicle;
   a vehicle controller connected to each camera in the plurality of cameras, the vehicle controller including an extrapolation algorithm configured to generate at least one extrapolated image based at least in part on an image feed from the plurality of cameras, the at least one extrapolated image being from a perspective of a virtual camera position offset from the vehicle, wherein the virtual camera position is one of multiple fixed virtual camera positions stored in the vehicle controller; and
   a display configured to display the at least one extrapolated image to a vehicle operator, wherein the displayed virtual camera position is selected from the multiple fixed virtual camera positions based on a location of an object detected by the vehicle controller, the displayed virtual camera position includes an obstruction between the virtual camera position and the object detected by the vehicle controller, and where the obstruction is rendered at least partially transparent.

2. The mirror replacement system of claim 1, further comprising a plurality of sensors disposed about the vehicle, each sensor being communicatively coupled to the vehicle controller.

3. The mirror replacement system of claim 1, wherein the plurality of cameras includes cameras configured to generate at least one of a class II view, a class IV view, a class V view, a class VI view, and a class VIII view.

4. The mirror replacement system of claim 1, wherein the virtual camera position is manually adjustable by the vehicle operator.

5. The mirror replacement system of claim 1, wherein the virtual camera position is adjustable on a single axis.

6. The mirror replacement system of claim 1, wherein the virtual camera position is adjustable on two axes.

7. The mirror replacement system of claim 1, wherein the virtual camera position is adjustable on three axes.

8. The mirror replacement system of claim 1, wherein the vehicle controller is connected to at least one source of data exterior to the vehicle, and wherein data from the at least one source is used by the extrapolation algorithm.

9. The mirror replacement system of claim 8, wherein the at least one source of data includes a wireless connection to a local sensor.

10. The mirror replacement system of claim 8, wherein the at least one source of data includes a fleet management system connected to the vehicle controller via a long range wireless connection.

11. The mirror replacement system of claim 1, wherein the at least one extrapolated image is a video image.

12. The mirror replacement system of claim 1, wherein the at least one extrapolated image includes at least two extrapolated images.

13. A mirror replacement system for a motor vehicle comprising:

a plurality of cameras disposed about a vehicle;

a vehicle controller connected to each camera in the plurality of cameras, the vehicle controller including an extrapolation algorithm configured to generate at least one extrapolated image based at least in part on an image feed from the plurality of cameras, the at least one extrapolated image being from a perspective of a virtual camera position offset from the vehicle, the vehicle controller is connected to at least one source of data exterior to the vehicle, and wherein data from the at least one source is used by the extrapolation algorithm; and a display configured to display the at least one extrapolated image to a vehicle operator.

14. The mirror replacement system of claim 13, wherein the at least one source of data exterior to the vehicle includes a stationary camera not mounted to the vehicle.

15. The mirror replacement system of claim 13, wherein the at least one source of data includes a fleet management system connected to the vehicle controller via a long range wireless connection.

16. A mirror replacement system for a motor vehicle comprising:

a plurality of cameras disposed about a vehicle;

a vehicle controller connected to each camera in the plurality of cameras, the vehicle controller including an extrapolation algorithm configured to generate at least one extrapolated image based at least in part on an image feed from the plurality of cameras, the at least one extrapolated image being from a perspective of a virtual camera position offset from the vehicle, the vehicle controller is connected to at least one source of data exterior to the vehicle and the at least one source of data includes a wireless connection to local sensors in an operating environment, the local sensors including proximity sensors and a camera disposed on a drone, and wherein data from the at least one source is used by the extrapolation algorithm; and a display configured to display the at least one extrapolated image to a vehicle operator.

* * * * *